W. F. HAMILTON.
CULTIVATOR STANDARD ATTACHMENT.
APPLICATION FILED JAN. 21, 1911.
1,001,522.
Patented Aug. 22, 1911.
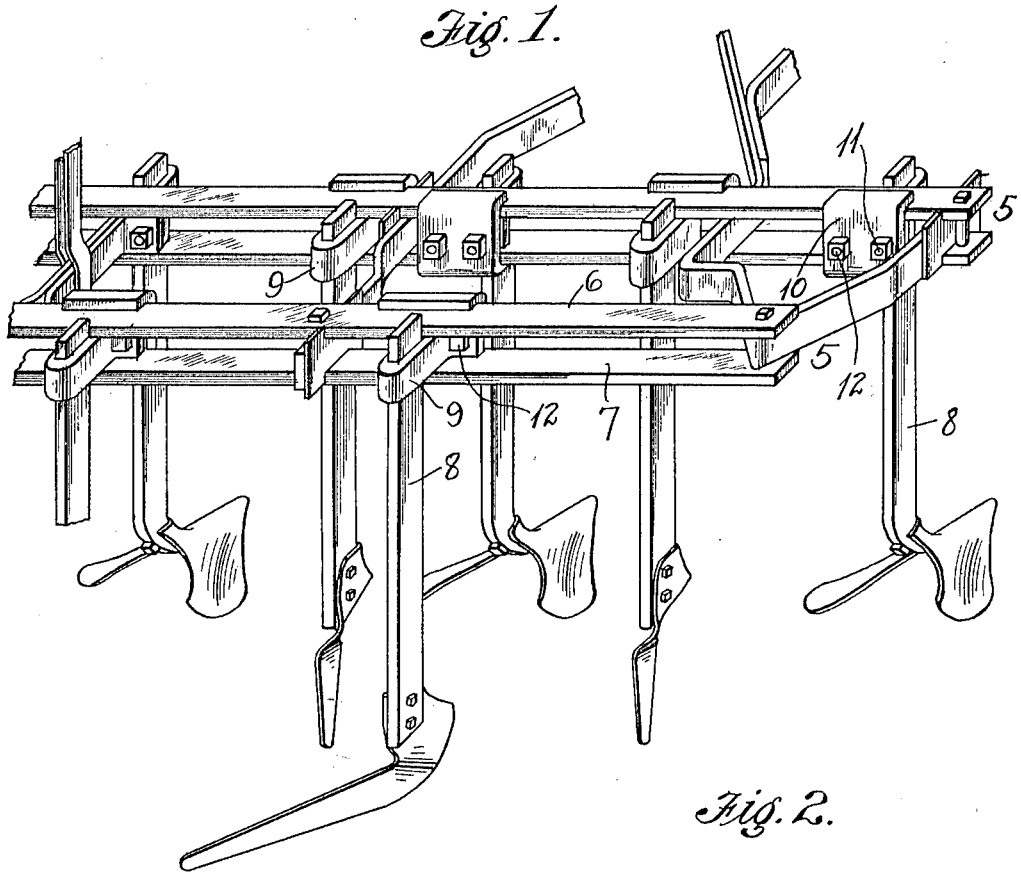
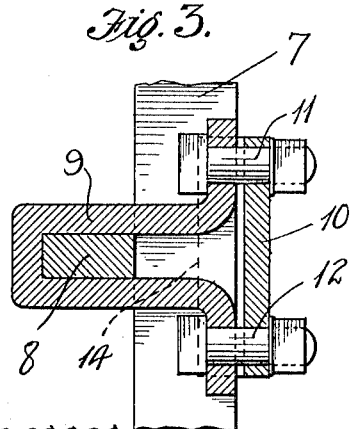
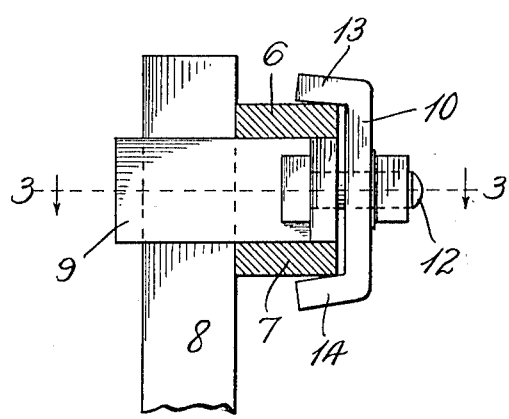
Witnesses.
Inventor.
William F. Hamilton.
By
Attys.

UNITED STATES PATENT OFFICE.

WILLIAM F. HAMILTON, OF VENTURA, CALIFORNIA.

CULTIVATOR-STANDARD ATTACHMENT.

1,001,522.     Specification of Letters Patent.     Patented Aug. 22, 1911.

Application filed January 21, 1911. Serial No. 603,877.

*To all whom it may concern:*

Be it known that I, WILLIAM F. HAMILTON, a citizen of the United States, residing at Ventura, in the county of Ventura and State of California, have invented new and useful Improvements in Cultivator-Standard Attachments, of which the following is a specification.

This invention relates to improvements in cultivator attachments and particularly such as are adapted for securing cultivator standards to the bars or framing of a cultivator.

It is the object of the invention to provide a means for supporting standards for all kinds of cultivators, to the framing of a cultivating implement so that a vertical adjustment of the standard may be had, the same means also affording means for accomplishing the lateral adjustment of the said standard to different points upon the cultivator framing.

It is also an object of the invention to provide means for adjustably securing cultivator standards upon the frame of a cultivator implement, so that it may not only be adjustably held thereon but the bars carrying the said standards may be also strengthened and stiffened.

In the accompanying drawing forming a part of this specification, Figure 1 is a perspective view of a portion of a cultivating implement showing a number of standards carrying soil engaging means applied thereon. Fig. 2 is a detailed view of the upper portion of a standard and the means for holding it upon the bars of the implement shown in side elevation, the said bars of the implement being sectioned. Fig. 3 is a detail sectional view taken upon the line 3—3 of Fig. 2.

Referring more particularly to the parts of the invention, which have been clearly illustrated in the accompanying drawing, 5 indicates an implement bar comprising upper and lower component bars 6 and 7 which are secured together at intervals by bolts or other means as preferred. The said bars have a suitable space between them for receiving the clip for fastening the standards to the said bar.

The standard as 8 is preferably made rectangular in cross section and fits against the edges of the cultivator bar sections 6 and 7. The said standard is drawn against the said edges by the attaching clip piece 9 which fits between the component bar members 6 and 7. In order to draw the said securing clip 9 in place, a plate as 10 is applied upon the opposite side of the cultivator bar 5 and engages the opposite edges of the component portions 6 and 7 of said bar frame which is thus engaged by the said standard 8. Bolts as 11 and 12 pass through the clip 9 and apertures formed in the said plate 10 for drawing the parts tightly together. The plate 10 is preferably formed with upper and lower flanges 13 and 14 which are slightly inclined and receive the edges of the bars 6 and 7 between them. By drawing up the nuts of the bolts 11 and 12 the plate 10 and the clip 9 are drawn toward each other firmly holding the standard against the edges of the bars 6 and 7. The said bars 6 and 7 are at the same time pinched upon the edges of the clip 9 by the action of the flanges 13 and 14 of said plate. The standard attachment thus serves to greatly strengthen and stiffen the said bars 6 and 7 composing the cultivator framing bar 5.

It will be evident that the standard of any cultivator which will fit into the clip 9 may be applied to either edge of the cultivator double bar 5. Thus as shown in Fig. 1 some of the standards are fastened to the forward edge of the bar front 5 while others are attached to the rear edge.

In order to adjust the height of any standard as 8 it is only necessary to loosen the bolts 11 and 12 when said standard may be raised or lowered in the securing clip 9. At the same time also the bar may be moved longitudinally upon the cultivator bar 5 and when desired position is attained the bolts are tightened again for firmly gripping the bars in place.

In practice the adjustment described is found to be very effective for preventing the twisting or turning of the standards or sockets of the various kinds of cultivators employed in operating upon the soil.

The securing of the standard to the double bars 5 of the cultivator frame is also found to greatly strengthen and stiffen the said bars. Thus a simple and economical cultivator bar can be employed and a firm attachment of an adjustable character for standards or sockets of various cultivating devices may be secured.

It will be readily understood that my cultivator bar in which a horizontal elongated opening or slot is provided such as a space between the bars 6 and 7, can be used in connection with the attachment of the present invention without departing from the spirit and scope of the present invention.

What I claim is:—

A cultivator attaching means, comprising a standard, a supporting beam therefor, having upper and lower bars spaced apart, a standard engaging clip fitting between the bars, and forming a bracing strut therefor, and a clamp plate having inclined flanges for embracing the upper and lower bars, the said plate operating to draw the clip inwardly for forcing the standard against the edges of the bars, and also operating to bind the bars tightly against the said clip.

In witness that I claim the foregoing I have hereunto subscribed my name this 11th day of January, 1911.

WILLIAM F. HAMILTON.

Witnesses:
D. G. BOWKER,
CHAS. SWELL.

Copies of this patent may be obtained for five cents each, by addressing the "Commissioner of Patents, Washington, D. C."